(No Model.)
T. L. TURNER.
BICYCLE.
No. 599,048. Patented Feb. 15, 1898.
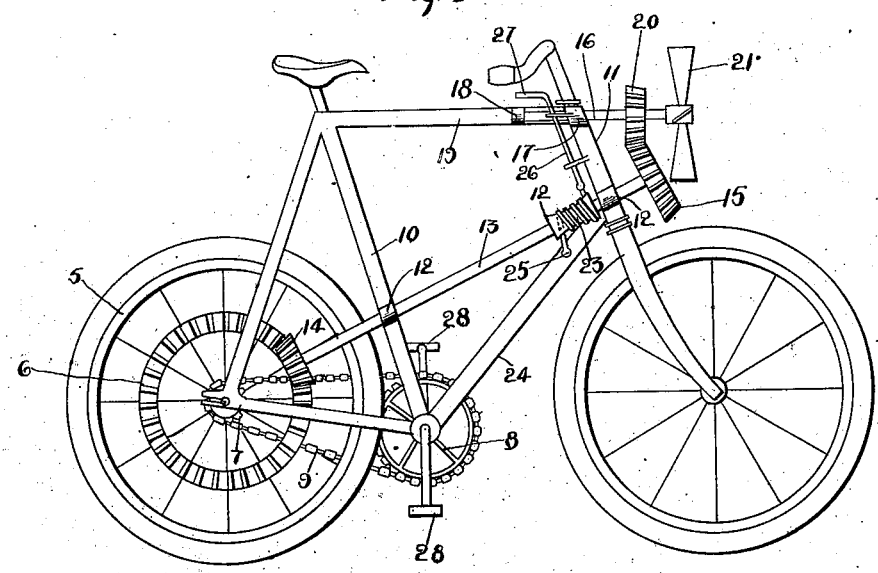
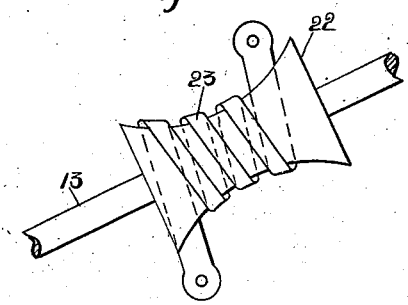
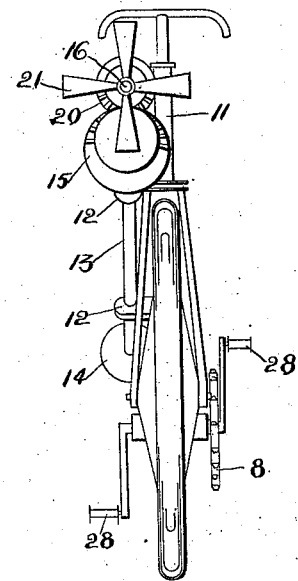
WITNESSES
J. A. Brophy
C. Gerst
INVENTOR
Thomas L. Turner
BY
Edgar Tate & Co
ATTORNEYS

UNITED STATES PATENT OFFICE.

THOMAS LORD TURNER, OF McALESTER, INDIAN TERRITORY, ASSIGNOR OF ONE-FOURTH TO WILLIAM LEWIS, OF KREBS, INDIAN TERRITORY.

BICYCLE.

SPECIFICATION forming part of Letters Patent No. 599,048, dated February 15, 1898.

Application filed January 23, 1897. Serial No. 620,382. (No model.)

*To all whom it may concern:*

Be it known that I, THOMAS LORD TURNER, a citizen of the United States, residing at McAlester, Choctaw Nation, Indian Territory, have invented certain new and useful Improvements in Bicycles, of which the following is a full and complete specification, such as will enable those skilled in the art to which it appertains to make and use the same.

This invention relates to bicycles and similar vehicles; and the object thereof is to provide an improved propelling mechanism for vehicles of this class whereby the vehicle may be propelled at a maximum speed with a minimum application of power; and with this and other objects in view the invention consists in the propelling mechanism for vehicles of this class hereinafter described and claimed.

In the drawings forming part of this specification I have shown my invention applied to a bicycle of the usual form, and the invention is fully disclosed in the following specification, of which the accompanying drawings form a part, in which—

Figure 1 is a side view of a bicycle provided with my improvement; Fig. 2, a side view of the propelling mechanism and showing part of the brake which I employ, and Fig. 3 a front view of the vehicle as shown in Fig. 1.

In Figs. 1 and 2 of the accompanying drawings I have shown a bicycle of the usual form, the frame thereof being what is known as a "diamond" frame, and the separate parts of my improvement are designated by the same numerals of reference in each of the views, and in the practice of my invention I secure to the drive-wheel 5 a circular gear 6, which is arranged concentrically of the hub thereof and is or may be secured to the spokes of the drive-wheel, and the hub of the drive-wheel is provided with the usual sprocket-wheel 7, which is geared in connection with the usual sprocket-wheel 8 on the pedal-shaft by a drive-chain 9.

The upright rod 10, which extends from the support of the pedal-shaft to the seat-support, and the tubular head 11, through which the upright rod of the forward fork, in which the guide-wheel is mounted, passes, are provided with keepers or bearings 12, in which is mounted a shaft 13, the rear end of which is provided with a beveled gear-wheel 14, which operates in connection with the circular gear 6, and the forward end of the shaft 13 is provided with a beveled gear-wheel 15, and I also provide a horizontal shaft 16, which is mounted in a keeper or bearing 17, secured to or formed on the upper end of the tubular head 11, and another keeper or bearing 18, secured to or formed on the upper horizontal rod 19, and said shaft is provided near its outer end with a beveled gear-wheel 20, which operates in connection with the beveled gear-wheel 15, and the shaft 16 is provided at its outer end with a wind-wheel 21.

Mounted on and secured to the shaft 13, rearwardly of the tubular head 11, is a drum 22, which is of the form shown in Figs. 1 and 2, the sides thereof being cut out or concave longitudinally, and passing around said drum is a steel or other band 23, one end of which is secured to the bottom rod 24 of the frame of the vehicle, as shown at 25, and the other end thereof is connected with a vertically-movable rod 26, which is mounted in keepers secured to the tubular head 11, and provided at its upper end with a backwardly-directed handle 27.

The operation will be readily understood from the foregoing description, when taken in connection with the accompanying drawings and the following statement thereof.

The vehicle is or may be propelled by the feet in the usual manner by means of the pedals 28, and in the operation of the vehicle the air revolves the wind-wheel 21, and this wind-wheel revolves the shaft 16. The shaft 16 revolves the shaft 13 by means of the gear-wheels 15 and 20, and the shaft 13 revolves the drive-wheel by means of the beveled gear-wheel 14 and the circular gear 16. It will thus be seen that the wind or air itself is caused to aid in propelling the vehicle, and it will also be apparent that changes in and modifications of the construction herein described may be made without departing from the spirit of my invention or sacrificing its advantages.

Whenever it is desired to apply the brake it is only necessary to pull upwardly on the rod 26, this operation resulting in tightening the band 23 on the drum 22, and as the shaft 13, on which said drum is mounted, is always revolving when the vehicle is in motion it will be apparent that the operation of said band by means of the rod 26 will constitute a simple and effective brake.

Having fully described my invention, I claim as new and desire to secure by Letters Patent—

The combination with a bicycle, provided with the usual means for propelling the same by the feet, of a circular gear connected with the drive-wheel concentrically of the hub thereof, a shaft mounted longitudinally of the frame, and provided at its rear end with a beveled gear-wheel which operates in connection with said circular gear, and at its forward end with a beveled gear-wheel which operates in connection with a beveled gear-wheel mounted on a horizontal shaft, which is also supported by the frame, and said horizontal shaft being provided at its forward end with a wind-wheel, said first-named shaft being also provided with a drum, on which is wound a steel or other band, one end of which is connected with the frame, and the other with a vertically-movable rod whereby said band operates as a brake, substantially as shown and described.

In testimony that I claim the foregoing as my invention I have signed my name, in presence of the subscribing witnesses, this 13th day of January, 1897.

THOMAS LORD TURNER.

Witnesses:
 ESTHER NANCY STEWART,
 OLIVER MORRIS WILLIAMS.